United States Patent
Saito (10) Patent No.: US 10,341,520 B2
(45) Date of Patent: *Jul. 2, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Tomoaki Saito, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/959,383

(22) Filed: Apr. 23, 2018

(65) Prior Publication Data

US 2018/0241899 A1    Aug. 23, 2018

Related U.S. Application Data

(63) Continuation of application No. 15/345,917, filed on Nov. 8, 2016, now Pat. No. 9,973,642.

(30) Foreign Application Priority Data

Jun. 27, 2016  (JP) ................................ 2016-126784

(51) Int. Cl.
*H04N 1/00* (2006.01)

(52) U.S. Cl.
CPC ..... *H04N 1/00973* (2013.01); *H04N 1/00204* (2013.01); *H04N 1/00307* (2013.01); *H04N 1/00925* (2013.01); *H04N 2201/0039* (2013.01); *H04N 2201/0075* (2013.01); *H04N 2201/0094* (2013.01)

(58) Field of Classification Search
CPC .......... G06F 9/54; G06F 9/541; G06F 9/546; H04N 2005/4432; H04N 21/42203; H04N 21/4394; H04N 21/4436; H04N 21/482; H04N 21/485; H04N 5/44513
USPC .......................................... 358/1.15; 709/223
See application file for complete search history.

(56) References Cited

U.S. PATENT DOCUMENTS 6,130,757 A * 10/2000 Yoshida ............. H04N 1/00915
                                                         358/1.14
8,438,079 B1    5/2013 Nguyen et al.
9,027,099 B1    5/2015 Saylor et al.
(Continued)

FOREIGN PATENT DOCUMENTS

JP    2008-251050 A    10/2008
JP    2012-022406 A    2/2012

OTHER PUBLICATIONS

May 16, 2017 Office Action issued in U.S. Appl. No. 15/345,917.
(Continued)

*Primary Examiner* — Negussie Worku
(74) *Attorney, Agent, or Firm* — Oliff PLC (57) ABSTRACT

An information processing apparatus includes a communication unit, a detection unit, and a remote operation unit. The communication unit communicates with an external device. The detection unit detects a sound. The remote operation unit operates the external device with at least one of operations on the external device invalidated, and validates an operation on the external device, which has been invalidated, in the case where a first specific sound is detected by the detection unit with a reception screen for receiving a specific input by a user displayed on the external device.

1 Claim, 9 Drawing Sheets

(56) References Cited

U.S. PATENT DOCUMENTS

| | | | |
|---|---|---|---|
| 9,135,529 B2* | 9/2015 | Okuno | G06K 15/007 |
| 9,331,856 B1 | 5/2016 | Song | |
| 9,973,642 B2* | 5/2018 | Saito | H04N 1/00204 |
| 2004/0232221 A1 | 11/2004 | Beenau et al. | |
| 2006/0000896 A1 | 1/2006 | Bonalle et al. | |
| 2006/0244993 A1* | 11/2006 | Konnai | G06F 3/1204 |
| | | | 358/1.15 |
| 2008/0137125 A1* | 6/2008 | Naitoh | H04L 41/06 |
| | | | 358/1.14 |
| 2010/0208631 A1 | 8/2010 | Zhang et al. | |
| 2011/0292975 A1* | 12/2011 | Kuwahara | H04N 1/00222 |
| | | | 375/219 |
| 2012/0007818 A1 | 1/2012 | Koga | |
| 2014/0211238 A1 | 7/2014 | Nakajima et al. | |
| 2014/0253969 A1 | 9/2014 | Okigami | |
| 2014/0333960 A1 | 11/2014 | Fukasawa | |
| 2015/0103375 A1 | 4/2015 | Mihira | |
| 2015/0104200 A1 | 4/2015 | Matsumoto | |
| 2015/0153984 A1 | 6/2015 | Furushige et al. | |
| 2015/0153988 A1 | 6/2015 | Tabuki et al. | |
| 2015/0193037 A1 | 7/2015 | Masaki | |
| 2015/0234624 A1 | 8/2015 | Nii et al. | |
| 2015/0281501 A1 | 10/2015 | Araki et al. | |
| 2015/0324159 A1 | 11/2015 | Sugaya et al. | |
| 2016/0021271 A1 | 1/2016 | Otake et al. | |
| 2016/0105307 A1 | 4/2016 | Kujirai | |
| 2016/0269574 A1 | 9/2016 | Takahashi | |
| 2017/0064121 A1 | 3/2017 | Matsuda et al. | |
| 2017/0070640 A1 | 3/2017 | Kondoh | |
| 2017/0094051 A1 | 3/2017 | Sakamoto | |
| 2017/0201850 A1 | 7/2017 | Raleigh et al. | |
| 2017/0220309 A1* | 8/2017 | Kato | G09G 5/391 |
| 2017/0279994 A1* | 9/2017 | Oshima | G06F 3/1222 |
| 2017/0312614 A1 | 11/2017 | Tran et al. | |
| 2017/0374211 A1* | 12/2017 | Saito | G06F 3/1286 |
| 2018/0262492 A1* | 9/2018 | Daniel | H04L 63/0807 |

OTHER PUBLICATIONS

Jun. 1, 2017 Office Action issued in U.S. Appl. No. 15/353,607.
U.S. Appl. No. 15/345,917, filed Nov. 8, 2016 in the name of Tomoaki Saito.
U.S. Appl. No. 15/353,607, filed Nov. 16, 2016 in the name of Tomoaki Saito.
Oct. 3, 2017 Office Action issued in U.S. Appl. No. 15/345,917.
Dec. 6, 2017 Office Action issued in U.S. Appl. No. 15/353,607.
Jan. 24, 2018 Notice of Allowance issued in U.S. Appl. No. 15/345,917.

* cited by examiner

INFORMATION PROCESSING APPARATUS AND NON-TRANSITORY COMPUTER READABLE MEDIUM

CROSS-REFERENCE TO RELATED APPLICATIONS

This application is a Continuation of application Ser. No. 15/345,917, filed on Nov. 8, 2016, which is based on and claims priority under 35 U.S.C. 119 from Japanese Patent Application No. 2016-126784, filed Jun. 27, 2016. The entire contents of which are incorporated herein by reference.

BACKGROUND

Technical Field

The present invention relates to an information processing apparatus and a non-transitory computer readable medium.

SUMMARY

According to an aspect of the present invention, there is provided an information processing apparatus including: a communication unit that communicates with an external device; a detection unit that detects a sound; and a remote operation unit that operates the external device with at least one of operations on the external device invalidated, and that validates an operation on the external device, which has been invalidated, in a case where a first specific sound is detected by the detection unit with a reception screen for receiving a specific input by a user displayed on the external device.

BRIEF DESCRIPTION OF THE DRAWINGS

An exemplary embodiment of the present invention will be described in detail based on the following figures, wherein.

DETAILED DESCRIPTION

Figure 1:
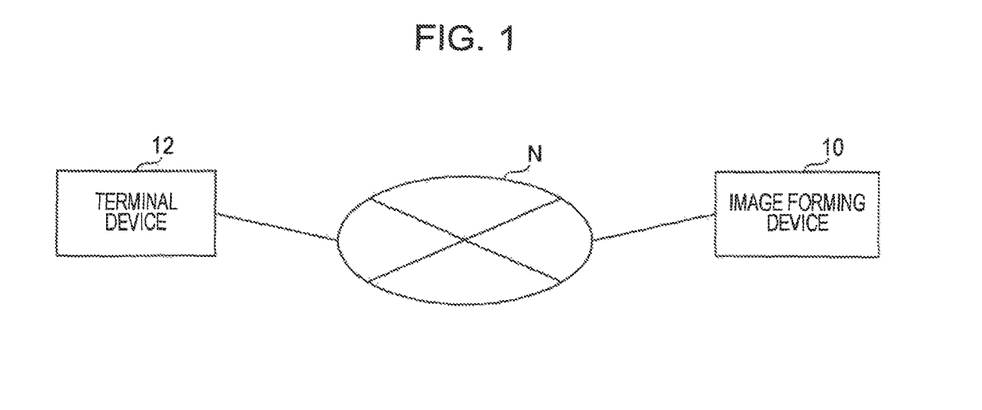
FIG. 1 is a block diagram illustrating an image forming system according to an exemplary embodiment of the present invention.

An image forming system that serves as an information processing system according to an exemplary embodiment of the present invention will be described with reference to FIG. 1. FIG. 1 illustrates the image forming system according to the exemplary embodiment. The image forming system includes an image forming device 10 and a terminal device 12. The image forming device 10 and the terminal device 12 communicate with each other via a communication path N such as a network. In the example illustrated in FIG. 1, one image forming device 10 is included in the image forming system. However, plural image forming devices 10 may be included in the image forming system. As a matter of course, other devices may be included in the image forming system.

The image forming device 10 is a device that includes an image forming function. Specifically, the image forming device 10 is a device that includes at least one of a scan function, a print function, a copy function, and a facsimile function. The image forming device 10 also includes a function of transmitting and receiving data to and from other devices.

The terminal device 12 is a device such as a personal computer (PC), a tablet PC, a smartphone, and a cellular phone, and includes a function of transmitting and receiving data to and from other devices.

In the image forming system according to the exemplary embodiment, the terminal device 12 includes a function of remotely operating the image forming device 10. In this case, the terminal device 12 corresponds to an example of the information processing apparatus, and the image forming device 10 corresponds to an example of the external device. As a matter of course, the image forming device 10 may include a function of remotely operating the terminal device 12. In this case, the image forming device 10 corresponds to an example of the information processing apparatus, and the terminal device 12 corresponds to an example of the external device.

A case where the terminal device 12 has the function of remotely operating the image forming device 10 will be described below. The terminal device 12 is provided at a customer center for the image forming device 10, and used by an operator at the customer center (e.g. a person who manages the image forming device 10), for example. It is assumed that a user (e.g. a customer) of the image forming device 10 and the operator at the customer center communicate with each other by telephone, through a video conference system, or the like, and that the operator explains a method of operating the image forming device 10 to the customer or instructs the customer how to operate the image forming device 10, for example. It is assumed that the operator remotely operates the image forming device 10 using the terminal device 12 in such situations.

Figure 2:
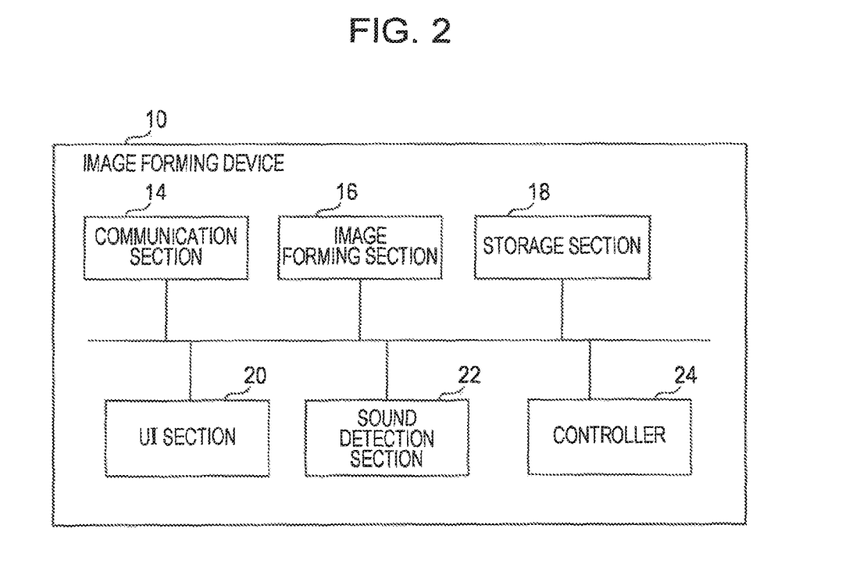
FIG. 2 is a block diagram illustrating an image forming device according to the exemplary embodiment.

The configuration of the image forming device 10 will be described in detail below with reference to FIG. 2. FIG. 2 illustrates the configuration of the image forming device 10.

A communication section 14 is a communication interface, and includes a function of transmitting data to other devices and a function of receiving data from other devices via the communication path N. The communication section 14 may be a communication interface that includes a wireless communication function, or may be a communication interface that includes a wired communication function.

An image forming section 16 performs an image forming process. For example, the image forming section 16 executes at least one of a scan function, a print function, a copy function, and a facsimile function. When the scan function is executed, a document is read to generate scan data (image data). When the print function is executed, an image is printed on a recording medium such as paper. When the copy function is executed, a document is read to be printed on a recording medium. When the facsimile function is executed, image data are transmitted or received by facsimile. The image data may be image data generated by reading a document, or may be image data transmitted from other devices. A composite function obtained by combining plural functions may be executed. For example, a scan-transfer function obtained by combining the scan function and a transmission function (transfer function) may be executed. When the scan-transfer function is executed, a document is read to generate scan data (image data), and the scan data are transmitted to a transmission destination. As a matter of course, such a combined function is merely exemplary, and different combined functions may be executed.

A storage section 18 is a storage device such as a hard disk. The storage section 18 stores execution instruction information (e.g. job information) that indicates an instruction to execute the image forming process, image data to be printed, scan data generated by executing the scan function, various control data, various programs, terminal address information that indicates the address of the terminal device 12, information that indicates the amount to be billed, the number of times of reception of execution of a process corresponding to the billing, information on resources that have been used (e.g. the count of sheets of paper), and so forth. As a matter of course, such information may be stored in separate storage devices, or may be stored in one storage device.

A user interface (UI) section 20 includes a display section and an operation section. The display section is a display device such as a liquid crystal display. The operation section is an input device such as a touch screen and a keyboard, and receives various operations including a remote operation.

A sound detection section 22 is a sound collector such as a microphone, and includes a function of detecting a sound. For example, when a user (e.g. a customer) who uses the image forming device 10 utters a voice, the voice is detected by the sound detection section 22.

A controller 24 controls operation of the various components of the image forming device 10. For example, the controller 24 invalidates at least one of operations on the UI section 20 under specific conditions. In the case where an operation is invalid, the operation may not be received. The controller 24 cancels the invalidation of operations on the UI section 20 and validates the operations under other specific conditions. In the case where an operation is valid, the operation may be received. For example, operations on the UI section 20 are validated when a specific sound (corresponding to an example of the first specific sound) is detected in the terminal device 12, and at least one of operations on the UI section 20 is invalidated when another specific sound (corresponding to an example of the second specific sound) is detected by the sound detection section 22 of the image forming device 10. In addition, at least one of operations on the UI section 20 may be invalidated when still another sound (corresponding to an example of the third specific sound) is detected in the terminal device 12.

Figure 3:
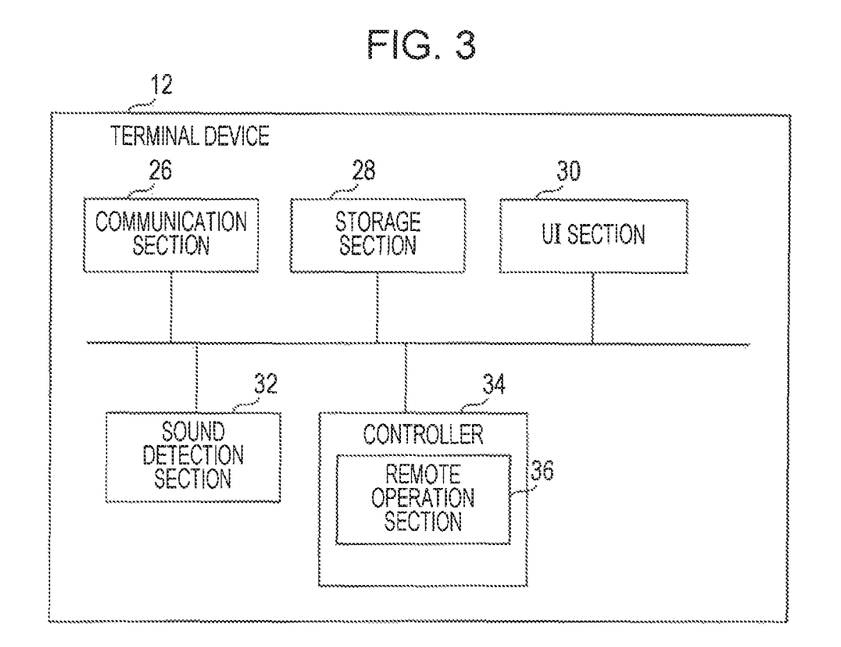
FIG. 3 is a block diagram illustrating a terminal device according to the exemplary embodiment.

The configuration of the terminal device 12 will be described in detail below with reference to FIG. 3. FIG. 3 illustrates the configuration of the terminal device 12.

A communication section 26 is a communication interface, and includes functions of transmitting and receiving data to and from other devices via the communication path N. The communication section 26 may be a communication interface that includes a wireless communication function, or may be a communication interface that includes a wired communication function.

The storage section 28 is a storage device such as a hard disk, and stores various programs, various data, device address information that indicates the address of the image forming device 10, and so forth.

A user interface (UI) section 30 includes a display section and an operation section. The display section is a display device such as a liquid crystal display. The operation section is an input device such as a touch screen, a keyboard, and a mouse. The UI section 30 corresponds to an example of the operation reception unit.

A sound detection section 32 is a sound collector such as a microphone, and includes a function of detecting a sound. For example, when a user (e.g. an operator at the customer center) who uses the terminal device 12 utters a voice, the voice is detected by the sound detection section 32.

A controller 34 controls operation of the various components of the terminal device 12. The controller 34 includes a remote operation section 36.

The remote operation section 36 remotely communicates with the image forming device 10 via the communication path N, and includes a function of remotely operating the image forming device 10. For example, the remote operation section 36 receives data on a screen being displayed on the UI section 20 of the image forming device 10 from the image forming device 10, and causes the UI section 30 of the terminal device 12 to display the screen. Consequently, in a remote communication state, the screen being displayed on the image forming device 10 is shared by the terminal device 12. The terminal device 12 may display the same screen as the screen being displayed on the image forming device 10, or may display a screen prepared by customizing (such as modifying or processing) the screen being displayed on the image forming device 10 for the terminal device 12. The remote operation section 36 also controls the authority to operate the screen being displayed on the UI section 20 of the image forming device 10. That is, the remote operation section 36 transfers the operation authority from the image forming device 10 to the terminal device 12 under specific conditions, and transfers the operation authority from the terminal device 12 to the image forming device 10 under other specific conditions. On the device to which the operation authority has been transferred, that is, the device having the operation authority, an operation on the screen being displayed on the UI section 20 of the image forming device 10 is valid. On the device from which the operation authority has been transferred, that is, the device not having the operation authority, an operation on the screen is invalid. An operation may be received on the device having the operation authority, and an operation may not be received on the device not having the operation authority. In the case where the terminal device 12 has the operation authority, an operation on the image forming device 10 through the UI section 30 of the terminal device 12 is valid. In the case where the terminal device 12 does not have the operation authority, an operation on the image forming device 10 through the UI section 30 of the terminal device 12 is invalid.

For example, in the case where a specific sound (corresponding to an example of the first specific sound) is detected by the sound detection section 32 of the terminal device 12 when at least one of operations on the UI section 20 of the image forming device 10 is invalid and a specific reception screen is displayed on the UI section 20 of the image forming device 10 in the remote communication state, the remote operation section 36 controls the image forming device 10 so as to validate the operations on the UI section 20 of the image forming device 10 which have been invalid. In the case where the specific reception screen is not displayed on the UI section 20 of the image forming device 10, the remote operation section 36 does not validate the operations on the UI section 20 of the image forming device 10 which have been invalidated, even in the case where the specific sound (corresponding to an example of the first specific sound) is detected. The specific reception screen may be a screen that receives a specific input made by a user (e.g. a customer). Examples of such a screen include a screen that prompts the user to make an input or an operation, more specifically a function selection screen, a menu screen about the image forming function, a setting screen about a specific image forming function (e.g. the copy function), a password input screen, and a billing screen (e.g. a screen that displays a function corresponding to specific billing and a screen in which a billing process is performed by executing a function). The first specific sound may be a voice about a transfer of the operation authority from the terminal device 12 to the image forming device 10. Examples of the first specific sound include voices such as "Go ahead", "Press", and "Please".

In the case where the specific sound (corresponding to an example of the first specific sound) is detected by the sound detection section 32 when the specific reception screen is displayed on the UI section 20 of the image forming device 10 in the remote communication state, the remote operation section 36 invalidates an operation through the UI section 30 of the terminal device 12, that is, prohibits reception of an operation through the UI section 30 of the terminal device 12. In addition, the remote operation section 36 may display, on the UI section 30 of the terminal device 12, information indicating that an operation on the UI section 30 of the terminal device 12 is invalid. Examples of the information indicating that an operation is invalid include display of a message saying "External device (image forming device 10) has operation authority", "Reception of operation is prohibited", or the like. The remote operation section 36 may display information on the UI section 30 of the terminal device 12 when the UI section 30 of the terminal device 12 receives an operation. When the UI section 30 of the terminal device 12 receives an operation, the remote operation section 36 may display information on the UI section 30 of the terminal device 12 and erase the information from the UI section 30, or may keep displaying the information, when a time of a threshold or more has elapsed, or may vary the manner of display of the information between immediately after the information is displayed and when a threshold time has elapsed (e.g. display characters in a larger size or in an otherwise conspicuous manner immediately after the characters are displayed and display the characters in a smaller size or at a different location when a threshold time has elapsed) to display the information in a manner that is distinguishable from the manner of display immediately after the information is displayed. In the case where the specific reception screen is not displayed on the UI section 20 of the image forming device 10, the remote operation section 36 does not invalidate the operations through the UI section 30 of the terminal device 12 but keeps the operations valid, even in the case where the specific sound (corresponding to an example of the first specific sound) is detected.

When another specific sound (corresponding to an example of the second specific sound) is detected by the sound detection section 22 of the image forming device 10 in the case where operations on the UI section 20 of the image forming device 10 are valid in the remote communication state, the controller 24 of the image forming device 10 invalidates operations on the UI section 20 of the image forming device 10, and the remote operation section 36 validates operations on the UI section 30 of the terminal device 12. In addition, the remote operation section 36 may display, on the UI section 30 of the terminal device 12, information indicating that an operation on the UI section 30 of the terminal device 12 is valid. Examples of the information indicating that an operation is valid include display of a message saying "Operation authority has been transferred to you", "You have operation authority", or the like. For example, when a second specific sound is detected by the sound detection section 22 of the image forming device 10 with information indicating that an operation on the UI section 30 of the terminal device 12 is invalid displayed on the UI section 30 of the terminal device 12, the remote operation section 36 validates operations on the UI section 30 of the terminal device 12, and causes the display section of the UI section 30 of the terminal device 12 to display information indicating that an operation on the UI section 30 is valid. The second specific sound may be a voice about a transfer of the operation authority from the image forming device 10 to the terminal device 12. Examples of the second specific sound include voices such as "Operation is finished" and "Operation is completed".

When still another specific sound (corresponding to an example of the third specific sound) is detected by the sound detection section 22 with operations on the UI section 20 of the image forming device 10 valid and with operations on the UI section 30 of the terminal device 12 invalid in the remote communication state, the remote operation section 36 may validate operations on the UI section 30 of the terminal device 12 and invalidate operations on the UI section 20 of the image forming device 10 which have been validated. The third specific sound may be a voice about a transfer of the operation authority from the image forming device 10 to the terminal device 12. Examples of the third specific sound include voices such as "Operator will operate".

The image forming system according to the exemplary embodiment will be described in detail below.

Figure 4:
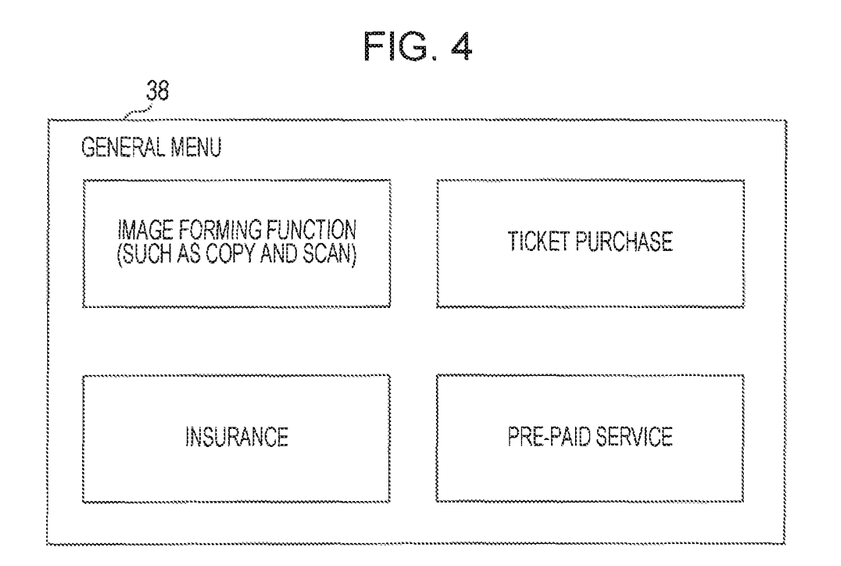
FIG. 4 illustrates an example of a general menu screen.

First, the screen displayed on the UI section 20 of the image forming device 10 will be described in detail. FIG. 4 illustrates a general menu screen 38 that serves as an example of the screen. The general menu screen 38 is a principal menu screen (e.g. a topmost screen), and the controller 24 of the image forming device 10 causes the UI section 20 to display the general menu screen 38 as the initial screen, for example. The general menu screen 38 includes, as displayed thereon, a button image for designating the image forming function and button images for designating other services, for example. As a matter of course, the information displayed on the general menu screen 38 is merely exemplary, and the general menu screen 38 may include other information as displayed thereon, or a part of the information in the illustration may not be displayed.

Figure 5:
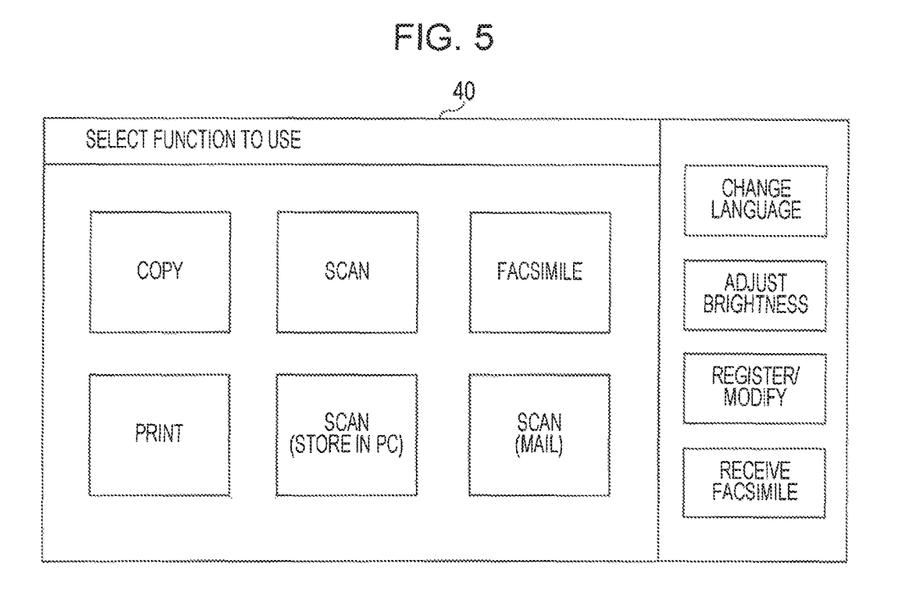
FIG. 5 illustrates an example of a function selection screen.

FIG. 5 illustrates a function selection screen 40 as another example of the screen. For example, when the button image for selecting the image forming function is pressed by the user on the general menu screen 38, the controller 24 of the image forming device 10 causes the UI section 20 to display the function selection screen 40. That is, the screen transitions from the general menu screen 38 to the function selection screen 40. The function selection screen 40 includes, as displayed thereon, button images for designating individual image forming functions (e.g. the copy function, the print function, the scan function, and the facsimile function). When a button image is pressed by the user, the controller 24 of the image forming device 10 causes the UI section 20 to display a screen for setting a function corresponding to the button image. The information displayed on the function selection screen 40 is merely exemplary, and the function selection screen 40 may include information about other functions as displayed thereon, or a part of the information in the illustration may not be displayed. When another button image is pressed by the user on the general menu screen 38, a screen corresponding to the button image is displayed on the UI section 20.

Figure 6:
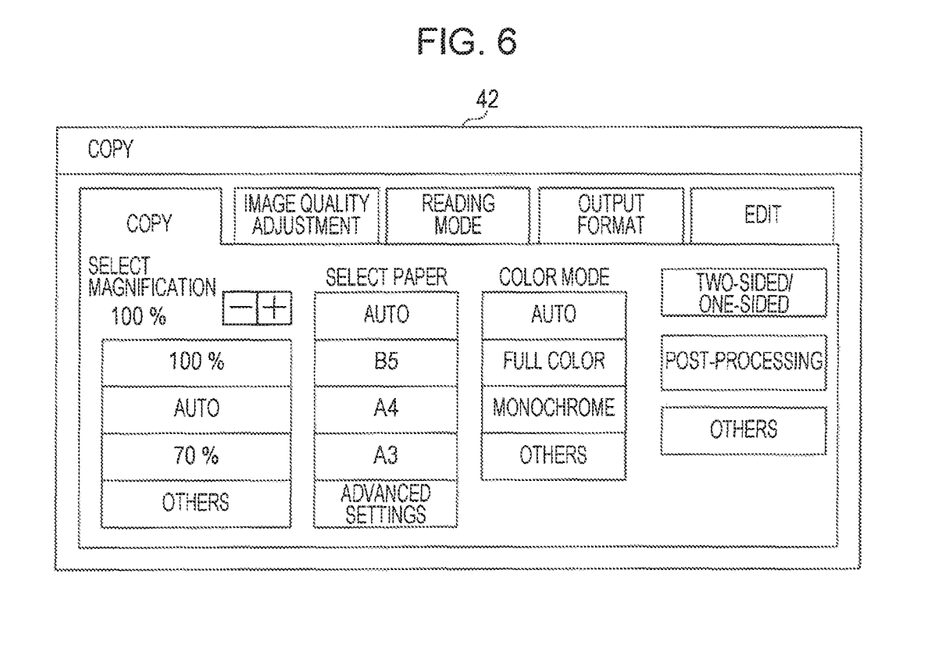
FIG. 6 illustrates an example of a copy setting screen.

FIG. 6 illustrates a copy setting screen 42 as another example of the screen. When a button image corresponding to the copy function is pressed by the user on the function selection screen 40, for example, the controller 24 of the image forming device 10 causes the UI section 20 to display the copy setting screen 42. That is, the screen transitions from the function selection screen 40 to the copy setting screen 42. Setting items about copying are displayed on the copy setting screen 42. Setting for copying is made on the copy setting screen 42. When an instruction for copying is provided by the user, the image forming device 10 executes copying. In the case where a button image corresponding to an image forming function other than the copy function is pressed by the user, a setting screen corresponding to the designated image forming function is displayed on the UI section 20, and setting for the image forming function is made on the setting screen.

In the remote communication state, the screen (such as the general menu screen 38, the function selection screen 40, and the copy setting screen 42) displayed on the UI section 20 of the image forming device 10 is shared by the terminal device 12. That is, in the case where the screen is displayed on the UI section 20 of the image forming device 10, data on the screen are transmitted from the image forming device 10 to the terminal device 12, and the remote operation section 36 of the terminal device 12 causes the UI section 30 of the terminal device 12 to display the screen. Consequently, the screen is shared by the image forming device 10 and the terminal device 12.

In the example described above, the general menu screen 38 corresponds to the principal menu screen (e.g. a topmost screen), and the function selection screen 40 corresponds to a screen that is subordinate to the general menu screen 38. However, the function selection screen 40 may be the principal menu screen. In this case, the general menu screen 38 is not displayed on the UI section 20, and the function selection screen 40 is displayed on the UI section 20 as the initial screen.

Figure 7:
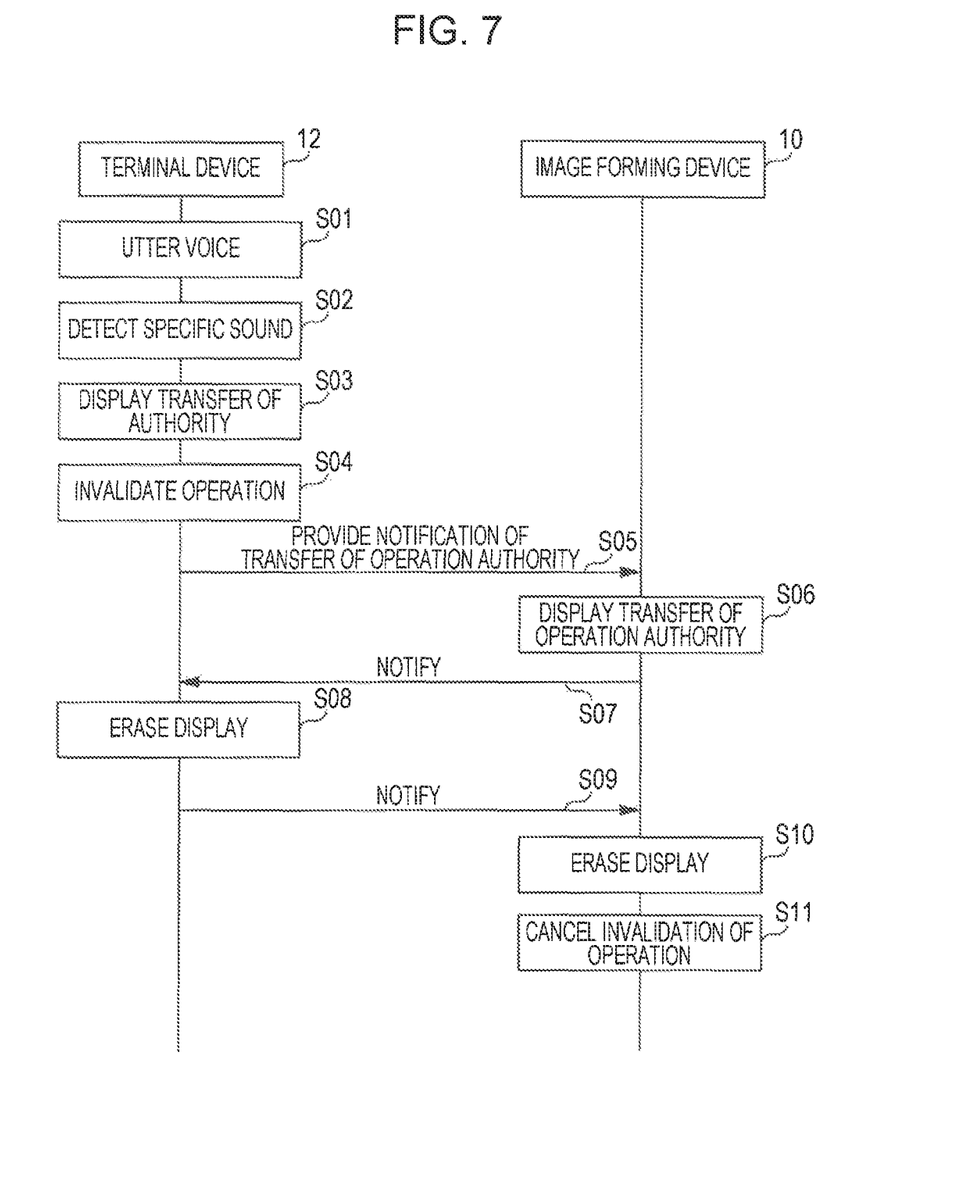
FIG. 7 is a sequence diagram illustrating an example of a process performed by the image forming system according to the exemplary embodiment.

A process performed by the image forming system according to the exemplary embodiment will be described below with reference to FIG. 7. FIG. 7 is a sequence diagram illustrating the process.

By way of example, it is assumed that the user (e.g. a customer) of the image forming device 10 and the user (e.g. an operator at the customer center) of the terminal device 12 are having a conversation with each other by telephone or through a video conference system, and that the image forming device 10 and the terminal device 12 are remotely communicating with each other. In addition, it is assumed that in the remote communication state, the terminal device 12 has the authority to operate the UI section 20 of the image forming device 10 and the image forming device 10 does not have the authority to operate the UI section 20 of the image forming device 10 itself. That is, it is assumed that operations of the image forming device 10 through the UI section 30 of the terminal device 12 are valid, and that operations of the image forming device 10 through the UI section 20 of the image forming device 10 are invalid. A case where the operation authority is transferred from the terminal device 12 to the image forming device 10 in this state will be described below.

With a specific reception screen (e.g. a menu screen, the function selection screen 40, a password input screen, or a billing screen) displayed on the UI section 20 of the image forming device 10, the user (e.g. an operator at the customer center) of the terminal device 12 utters a voice for transferring the operation authority to the image forming device 10 (S01). For example, the operator utters a voice such as "Go ahead", "Press", and "Please".

When the sound detection section 32 of the terminal device 12 detects a first specific sound (e.g. the voice such as "Go ahead" described above) (S02), the remote operation section 36 causes the UI section 30 of the terminal device 12 to display information that indicates a transfer of the operation authority (S03), and invalidates operations on the UI section 30 of the terminal device 12 (S04). As the information that indicates a transfer of the operation authority, information indicating that an operation on the UI section 30 of the terminal device 12 is invalid is displayed on the UI section 30 of the terminal device 12, for example.

Next, the remote operation section 36 notifies the image forming device 10 of the transfer of the operation authority (S05). For example, information that indicates an instruction to transfer the operation authority is transmitted from the terminal device 12 to the image forming device 10 via the communication path N.

When information that indicates an instruction to transfer the operation authority is received from the terminal device 12, the controller 24 of the image forming device 10 causes the UI section 20 of the image forming device 10 to display information that indicates a transfer of the operation authority (S06). As the information that indicates a transfer of the operation authority, information indicating that an operation on the UI section 20 of the image forming device 10 is valid is displayed on the UI section 20 of the image forming device 10, for example.

Next, the controller 24 of the image forming device 10 transmits information indicating that an instruction to transfer the operation authority has been received to the terminal device 12 via the communication path N (S07). Upon receiving the information, the remote operation section 36 of the terminal device 12 erases display of the information that indicates the transfer of the operation authority from the UI section 30 of the terminal device 12 (S08). That is, the information that indicates the transfer of the operation authority is hidden.

After that, a notification of the erasure of the display is sent from the terminal device 12 to the image forming device 10 (S09), and the controller 24 of the image forming device 10 erases the display of the information that indicates the transfer of the operation authority from the UI section 20 of the image forming device 10 (S10). That is, the information that indicates the transfer of the operation authority is hidden. In addition, the controller 24 of the image forming device 10 cancels the invalidation of operations on the UI section 20 of the image forming device 10 (S11). Consequently, operations on the UI section 20 of the image forming device 10 are validated, and the UI section 20 may receive operations.

Similar processes are performed also in the case where the operation authority is transferred from the image forming device 10 to the terminal device 12. That is, when a second specific sound (e.g. a voice such as "Operation is finished") is detected by the sound detection section 22 of the image forming device 10 with the image forming device 10 having the operation authority and with a specific reception screen (e.g. the function selection screen 40) displayed on the UI section 20 of the image forming device 10, the operation authority is transferred from the image forming device 10 to the terminal device 12. Consequently, operations through the UI section 20 of the image forming device 10 are invalidated, and operations through the UI section 30 of the terminal device 12 are validated.

Screen transition in the image forming device 10 and the terminal device 12 will be described in detail below.

Figure 8A:
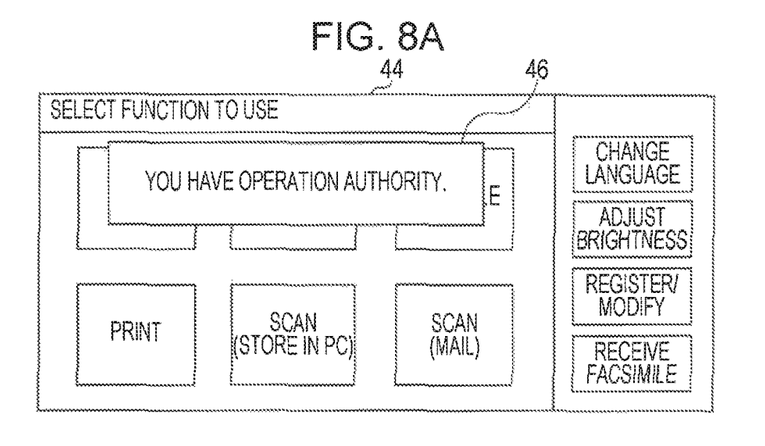
FIGS. 8A to 8C illustrate an example of screen transition in the terminal device.
Figure 8B:
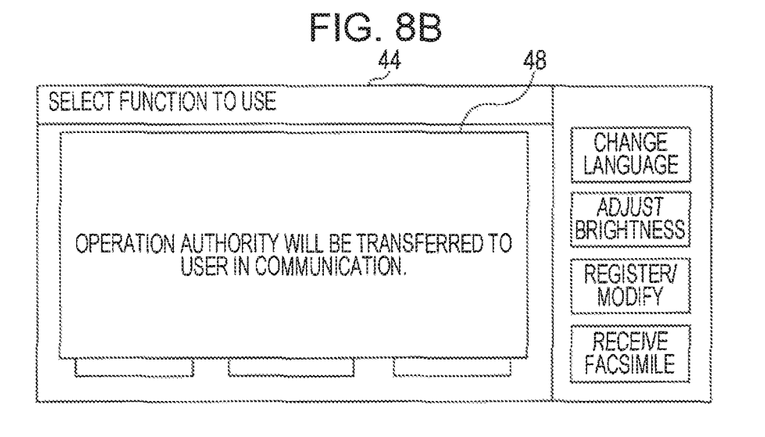
Figure 8C:
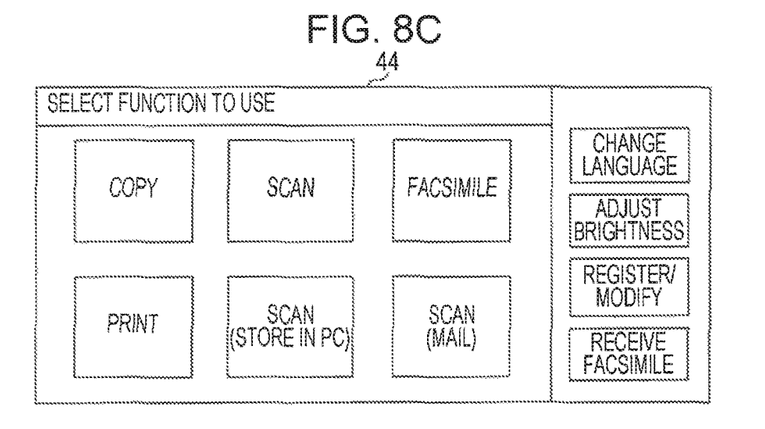
Figure 9A:
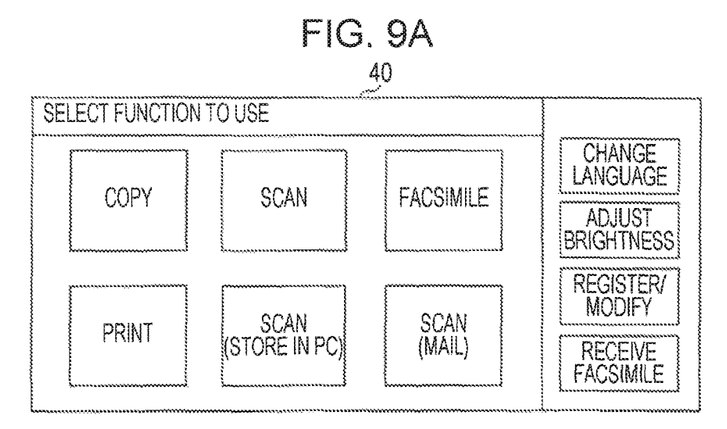
FIGS. 9A to 9C illustrate an example of screen transition in the image forming device.
Figure 9B:
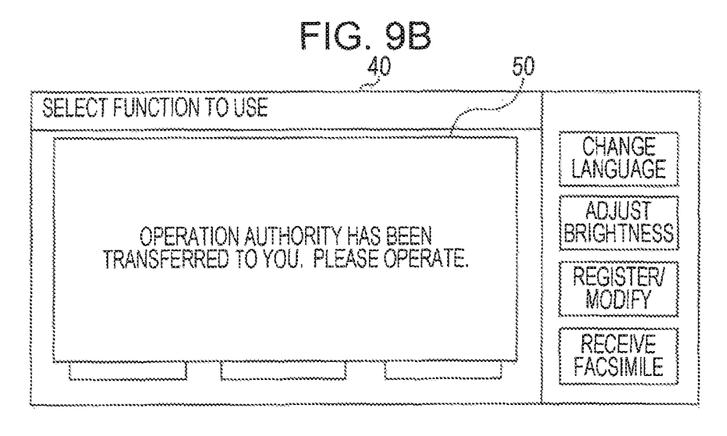
Figure 9C:
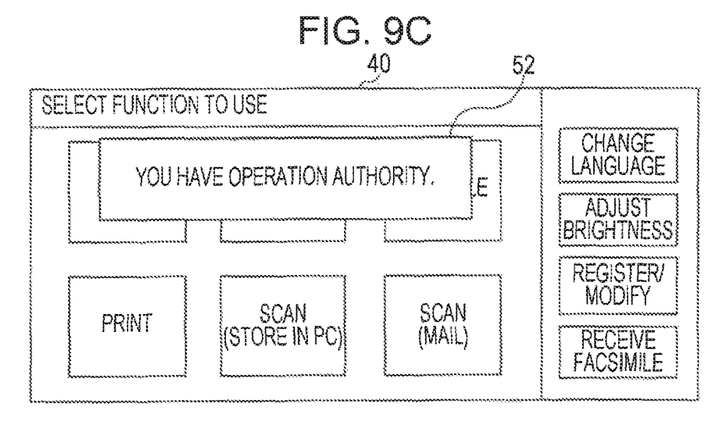

First, screen transition for a case where the operation authority is transferred from the terminal device 12 to the image forming device 10 will be described with reference to FIGS. 8A to 8C and 9A to 9C. FIGS. 8A to 8C illustrate an example of screen transition in the terminal device 12. FIGS. 9A to 9C illustrate an example of screen transition in the image forming device 10.

As illustrated in FIG. 9A, the function selection screen 40 illustrated in FIG. 5 is displayed on the UI section 20 of the image forming device 10 as a specific reception screen, for example. In the remote communication state, as illustrated in FIG. 8A, a function selection screen 44 is displayed on the UI section 30 of the terminal device 12. The function selection screen 44 is the same screen as the screen displayed on the image forming device 10. As a matter of course, a screen prepared by customizing the function selection screen 40 for the terminal device 12 may be displayed on the terminal device 12. In the case where the terminal device 12 has the operation authority, information indicating that the terminal device 12 has the operation authority (e.g. a message saying "You have operation authority.") is displayed on the function selection screen 44 as indicated by symbol 46.

When the user (e.g. an operator at the customer center) of the terminal device 12 utters a voice (e.g. a voice such as "Go ahead", which is a voice corresponding to the first specific sound) for transferring the operation authority to the image forming device 10 and the voice (first specific sound) is detected by the sound detection section 32 of the terminal device 12, the remote operation section 36 displays information that indicates a transfer of the operation authority (information indicated by symbol 48) on the function selection screen 44 as illustrated in FIG. 8B. Examples of the information that indicates a transfer of the operation authority include display of a message saying "Operation authority will be transferred to user in communication." or the like. In addition, the remote operation section 36 invalidates operations on the UI section 30 of the terminal device 12. Consequently, operations on the UI section 30 of the terminal device 12 may not be received.

The remote operation section 36 notifies the image forming device 10 of the transfer of the operation authority, and erases the information that indicates the transfer of the operation authority (information indicated by symbol 48) from the function selection screen 44 as illustrated in FIG. 8C.

When a notification of the transfer of the operation authority is received from the terminal device 12, the controller 24 of the image forming device 10 displays the information that indicates the transfer of the operation authority (information indicated by symbol 50) on the function selection screen 40 as illustrated in FIG. 9B. Examples of the information that indicates the transfer of the operation authority include display of a message saying "Operation authority has been transferred to you. Please operate." or the like. In addition, the controller 24 validates operations on the UI section 20 of the image forming device 10. Consequently, operations on the UI section 20 of the image forming device 10 may be received. The controller 24 displays information indicating that the image forming device 10 has the operation authority (information indicated by symbol 52) on the function selection screen 40 as illustrated in FIG. 9C. Examples of the information indicating that the image forming device 10 has the operation authority include display of a message saying "You have operation authority." or the like.

Figure 10A:
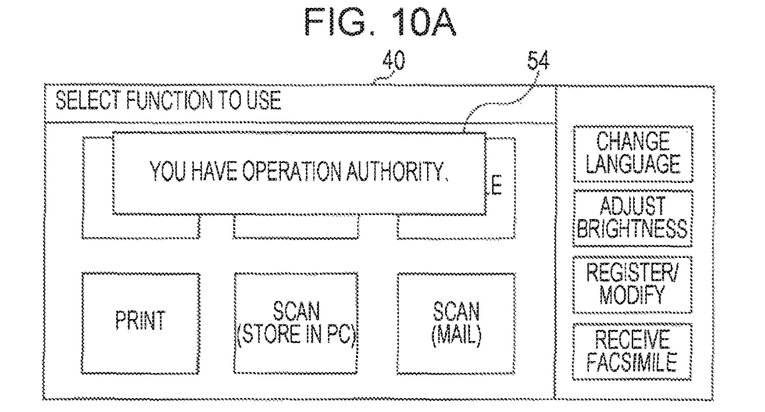
FIGS. 10A to 10C illustrate an example of screen transition in the image forming device.
Figure 10B:
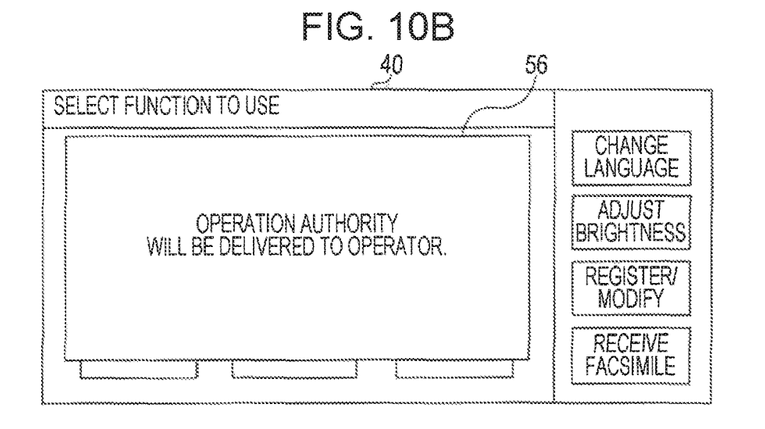
Figure 10C:
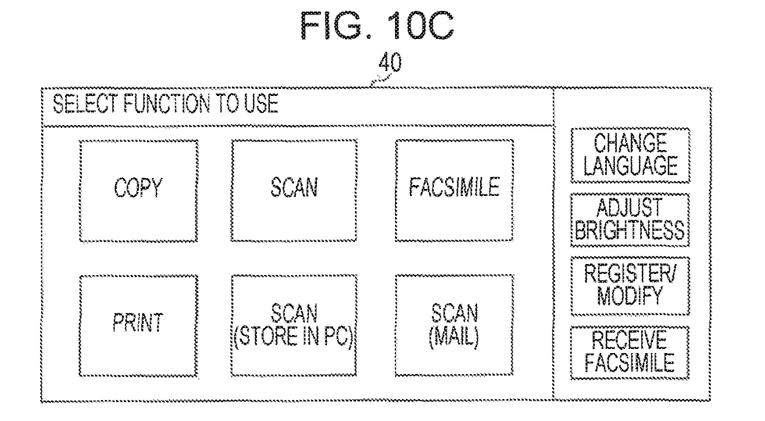
Figure 11A:
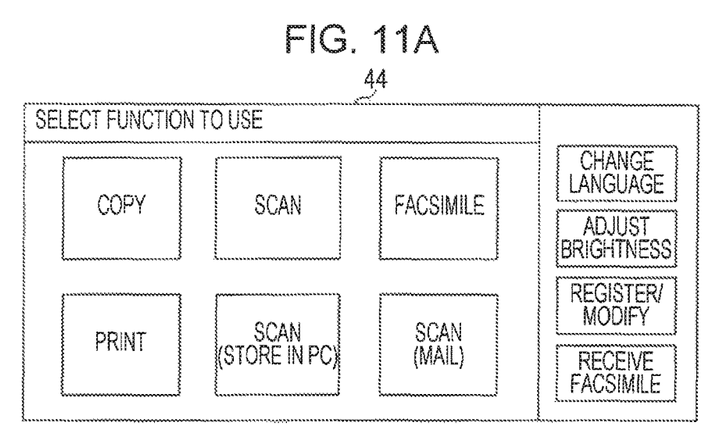
FIGS. 11A to 11C illustrate an example of screen transition in the terminal device.
Figure 11B:
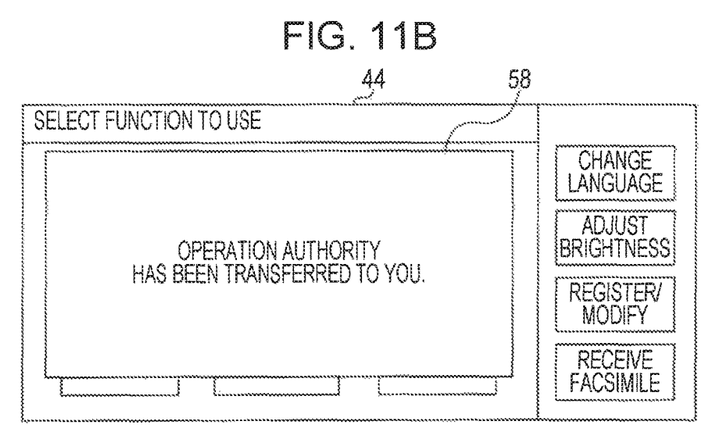
Figure 11C:
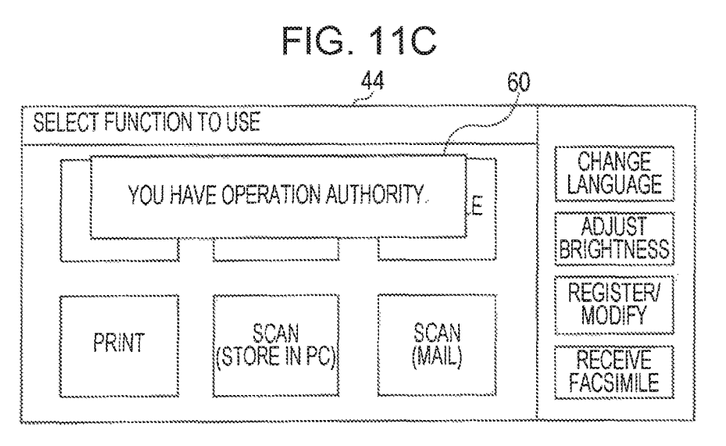

Next, screen transition for a case where the operation authority is transferred from the image forming device 10 to the terminal device 12 will be described with reference to FIGS. 10A to 10C and 11A to 11C. FIGS. 10A to 10C illustrate an example of screen transition in the image forming device 10. FIGS. 11A to 11C illustrate an example of screen transition in the terminal device 12.

As illustrated in FIG. 10A, the function selection screen 40 is displayed on the UI section 20 of the image forming device 10, for example. In the case where the image forming device 10 has the operation authority, information indicating that the image forming device 10 has the operation authority (e.g. a message saying "You have operation authority") is displayed on the function selection screen 40 as indicated by symbol 54. In the remote communication state, as illustrated in FIG. 11A, the function selection screen 44 corresponding to the function selection screen 40 is displayed on the UI section 30 of the terminal device 12.

When the user (e.g. a customer) of the image forming device 10 utters a voice (e.g. a voice such as "Operation is finished", which is a voice corresponding to the second specific sound) for transferring the operation authority to the operation authority 12 and the voice (second specific sound) is detected by the sound detection section 22 of the image forming device 10, the controller 24 of the image forming device 10 displays information that indicates a transfer of the operation authority (information indicated by symbol 56) on the function selection screen 40 as illustrated in FIG. 10B. Examples of the information that indicates a transfer of the operation authority include display of a message saying "Operation authority will be delivered to operator." or the like. In addition, the controller 24 invalidates operations on the UI section 20 of the image forming device 10. Consequently, operations on the UI section 20 of the image forming device 10 may not be received.

The controller 24 of the image forming device 10 notifies the terminal device 12 of the transfer of the operation authority, and erases the information that indicates the transfer of the operation authority (information indicated by symbol 56) from the function selection screen 40 as illustrated in FIG. 10C.

When a notification of the transfer of the operation authority is received from the image forming device 10, the remote operation section 36 of the terminal device 12 displays the information that indicates the transfer of the operation authority (information indicated by symbol 58) on the function selection screen 44 as illustrated in FIG. 11B. Examples of the information that indicates the transfer of the operation authority include display of a message saying "Operation authority has been transferred to you." or the like. In addition, the remote operation section 36 validates operations on the UI section 30 of the terminal device 12. Consequently, operations on the UI section 30 of the terminal device 12 may be received. The remote operation section 36 displays information indicating that the terminal device 12 has the operation authority (information indicated by symbol 60) on the function selection screen 44 as illustrated in FIG. 11C. Examples of the information indicating that the image forming device 10 has the operation authority include display of a message saying "You have operation authority." or the like.

Figure 12A:
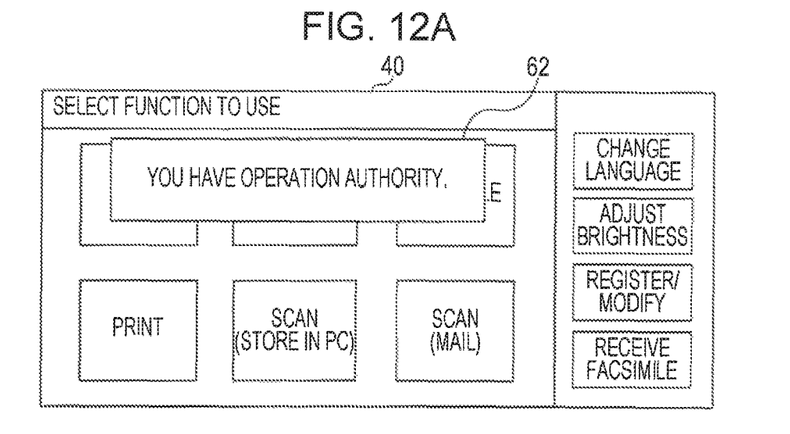
FIGS. 12A to 12C illustrate an example of screen transition in the image forming device.
Figure 12B:
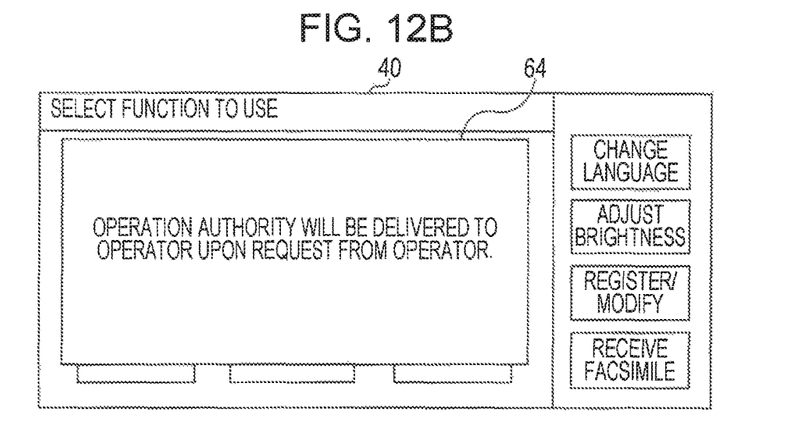
Figure 12C:
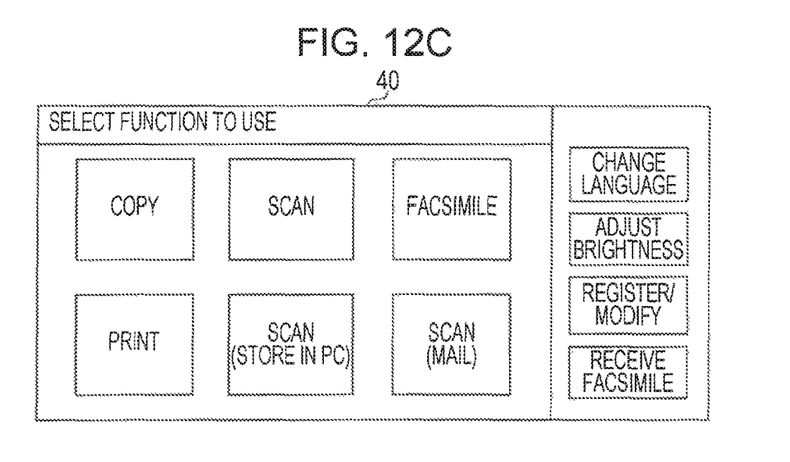

Next, screen transition for a case where the operation authority is forcibly transferred from the image forming device 10 to the terminal device 12 will be described with reference to FIGS. 11A to 11C and 12A to 12C. FIGS. 12A to 12C illustrate an example of screen transition in the image forming device 10.

As illustrated in FIG. 12A, the function selection screen 40 is displayed on the UI section 20 of the image forming device 10, for example. In the case where the image forming device 10 has the operation authority, information indicating that the image forming device 10 has the operation authority (e.g. a message saying "You have operation authority.") is displayed on the function selection screen 40 as indicated by symbol 62. In the remote communication state, as illustrated in FIG. 11A, the function selection screen 44 corresponding to the function selection screen 40 is displayed on the UI section 30 of the terminal device 12.

When the user (e.g. an operator at the customer center) of the terminal device 12 utters a voice (e.g. a voice such as "Operator will operate", which is a voice corresponding to the third specific sound) for forcibly transferring the operation authority to the terminal device 12 and the voice (third specific sound) is detected by the sound detection section 32 of the terminal device 12, the remote operation section 36 transmits information that indicates a request to forcibly acquire the operation authority to the image forming device 10 via the communication path N.

When information that indicates a request to forcibly acquire the operation authority is received from the terminal device 12, the controller 24 of the image forming device 10 displays information that indicates a forcible transfer of the operation authority (information indicated by symbol 64) on the function selection screen 40 as illustrated in FIG. 12B. Examples of the information that indicates a forcible transfer of the operation authority include display of a message saying "Operation authority will be delivered to operator upon request from operator" or the like. In addition, the controller 24 invalidates operations on the UI section 20 of the image forming device 10. Consequently, operations on the UI section 20 of the image forming device 10 may not be received.

The controller 24 of the image forming device 10 notifies the terminal device 12 of the transfer of the operation authority, and erases the information that indicates the transfer of the operation authority (information indicated by symbol 64) from the function selection screen 40 as illustrated in FIG. 12C.

When a notification of the transfer of the operation authority is received from the image forming device 10, the remote operation section 36 of the terminal device 12 displays the information that indicates the transfer of the operation authority (information indicated by symbol 58) on the function selection screen 44 as illustrated in FIG. 11B. Examples of the information that indicates the transfer of the operation authority include display of a message saying "Operation authority has been transferred to you." or the like. In addition, the remote operation section 36 validates operations on the UI section 30 of the terminal device 12. Consequently, operations on the UI section 30 of the terminal device 12 may be received. The remote operation section 36 displays information indicating that the terminal device 12 has the operation authority (information indicated by symbol 60) on the function selection screen 44 as illustrated in FIG. 11C. Examples of the information indicating that the terminal device 12 has the operation authority include display of a message saying "You have operation authority." or the like.

In the exemplary embodiment, as has been described above, in the case where a voice corresponding to an instruction to transfer the operation authority is detected, the operation authority is transferred between the image forming device 10 and the terminal device 12 without performing a specific operation other than providing a voice instruction. For example, in the case where a first specific sound is detected by the terminal device 12 with the terminal device 12 having the operation authority and with the image forming device 10 not having the operation authority, the operation authority is transferred from the terminal device 12 to the image forming device 10 even if a user (e.g. an operator or a customer) does not perform a specific operation other than providing a voice instruction. Similarly, in the case where a second specific sound is detected by the image forming device 10 with the image forming device 10 having the operation authority and with the terminal device 12 not having the operation authority, the operation authority is transferred from the image forming device 10 to the terminal device 12 even if a user (e.g. an operator or a customer) does not perform a specific operation other than providing a voice instruction. In addition, in the case where a third specific sound is detected by the terminal device 12, the operation authority is forcibly transferred from the image forming device 10 to the terminal device 12 even if a user does not perform a specific operation other than providing a voice instruction.

In the case where a first specific sound is detected by the terminal device 12 with a specific reception screen displayed on the UI section 20 of the image forming device 10 when the terminal device 12 has the operation authority and the image forming device 10 does not have the operation authority, the operation authority is transferred from the terminal device 12 to the image forming device 10. In the case where the specific reception screen is not displayed on the UI section 20 of the image forming device 10, the operation authority is not transferred from the terminal device 12 to the image forming device 10 even in the case where a first specific sound is detected by the terminal device 12. Examples of the specific reception screen include the function selection screen 40, a password input screen, and a billing screen. On such reception screens, it is assumed that a user (e.g. a customer) of the image forming device 10 himself/herself performs an operation, and that a remote operation by a user (e.g. an operator at the customer center) of the terminal device 12 is not suitable. That is, it is assumed that the user of the image forming device 10 himself/herself is required to perform an operation. By transferring the operation authority from the terminal device 12 to the image forming device 10 in the case where a first specific sound is detected by the terminal device 12 when such a specific reception screen is displayed on the image forming device 10, the operation authority for a screen, on which an operation by the user of the image forming device 10 himself/herself is required, is transferred to the image forming device 10. Meanwhile, if the operation authority is transferred from the terminal device 12 to the image forming device 10 in the case where a first specific sound is detected by the terminal device 12 even when a specific reception screen is not displayed on the image forming device 10, the operation authority for a screen, on which an operation by the user of the image forming device 10 himself/herself is not suitable, (e.g. a screen, on which an operation by an operator is suitable) may be transferred to the image forming device 10. That is, the operation authority for a screen, on which an operation by an operator is suitable, or a screen, on which an operation should be performed by an operator, may be erroneously transferred to the image forming device 10. In the exemplary embodiment, the operation authority is not transferred to the image forming device 10 when a specific reception screen is not displayed on the image forming device 10.

The image forming system according to the exemplary embodiment is assumed to be used in the following scenes. For example, in the case where a user (e.g. a customer) of the image forming device 10 does not know how to operate the image forming device 10, it is assumed that the customer consults an operator at the customer center to receive an instruction. In this case, the operator remotely operates the image forming device 10 through the terminal device 12 to cause the image forming device 10 to display a screen (e.g. a function selection screen, a password input screen, and a billing screen) requested by the customer, and transfers the operation authority from the terminal device 12 to the image forming device 10 when the screen is displayed. Consequently, an operation performed by the customer on the image forming device 10 is validated. For example, the customer selects a specific function on the function selection screen, inputs a password on the password input screen, or performs an operation that is necessary for a billing process (by way of example, presses a button to execute a process corresponding to the billing) on the billing screen. In the case where the operation is completed, the operation authority is transferred from the image forming device 10 to the terminal device 12, and the operator performs subsequent operations (e.g. an operation that is troublesome to the customer, a complicated operation, and an operation that should be performed by the operator). In the exemplary embodiment, the operation authority is transferred between the image forming device 10 and the terminal device 12 without performing a specific operation (e.g. a button operation) other than providing a voice instruction in such scenes.

In the exemplary embodiment described above, an operation is invalid, that is, an operation may not be received, on the UI section of the device not having the operation authority. In another example, an operation may be valid, that is, an operation may be received, also on the UI section of the device not having the operation authority. In this case, information indicating that an operation is prohibited (e.g. a message saying "Do not operate") may be displayed on the UI section of the device not having the operation authority so that an operation is not performed on the UI section of the device.

Images that represent software keys that represent the hardware keys provided on the UI section 20 of the image forming device 10 may be displayed on the UI section 30 of the terminal device 12, and the remote operation section 36 of the terminal device 12 may have a function of remotely operating the hardware keys of the image forming device 10.

In this case, an operation on the hardware keys on the UI section of the device having the operation authority is valid, and an operation on the hardware keys on the UI section of the device not having the operation authority is invalid.

In the example described above, the image forming system that includes the image forming device 10 and the terminal device 12 has been described above. However, the process related to the transfer of the operation authority through a voice instruction may be applied to systems that include a device other than the image forming device 10.

Each of the image forming device 10 and the terminal device 12 is implemented through cooperation between hardware resources and software, by way of example. Specifically, each of the image forming device 10 and the terminal device 12 includes one or more processors such as central processing units (CPUs) (not illustrated). The one or more processors read and execute a program stored in a storage device (not illustrated) to implement the functions of the various components of the image forming device 10 and the terminal device 12. The program is stored in the storage device by way of a storage medium such as a CD and a DVD, or by way of a communication path such as a network. In another example, the various components of each of the image forming device 10 and the terminal device 12 may be implemented by hardware resources such as a processor and an electronic circuit. For implementation, a device such as a memory may be utilized. In another example, the various components of each of the image forming device 10 and the terminal device 12 may be implemented by a digital signal processor (DSP) and a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
a sound detector; and
a processor configured to remotely control an external device, at least one function of the external device being invalidated while the external device is being remotely controlled, wherein
the invalidated function becomes validated in response to a certain sound being detected by the sound detector when a certain screen is being displayed on the external device, and
the invalidated function does not become validated in response to the detected certain sound when the certain screen is not being displayed on the external device.

* * * * *